(12) United States Patent
Kapitza

(10) Patent No.: US 11,749,812 B2
(45) Date of Patent: Sep. 5, 2023

(54) FUEL CELL PLATE

(71) Applicants: AUDI AG, Ingolstadt (DE); Volkswagen AG, Wolfsburg (DE)

(72) Inventor: Lars Kapitza, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 427 days.

(21) Appl. No.: 17/251,740

(22) PCT Filed: May 20, 2019

(86) PCT No.: PCT/EP2019/062920
§ 371 (c)(1),
(2) Date: Dec. 11, 2020

(87) PCT Pub. No.: WO2019/238360
PCT Pub. Date: Dec. 19, 2019

(65) Prior Publication Data
US 2021/0119230 A1    Apr. 22, 2021

(30) Foreign Application Priority Data

Jun. 13, 2018 (DE) ..................... 10 2018 209 441.1

(51) Int. Cl.
*H01M 8/0258* (2016.01)
*H01M 8/0247* (2016.01)

(52) U.S. Cl.
CPC ....... *H01M 8/0258* (2013.01); *H01M 8/0247* (2013.01)

(58) Field of Classification Search
CPC .... H01M 8/0258; H01M 8/0247; Y02E 60/50
See application file for complete search history.

(56) References Cited

U.S. PATENT DOCUMENTS

| | | | |
|---|---|---|---|
| 2001/0041281 A1 | 11/2001 | Wilkinson et al. | |
| 2008/0226963 A1 | 9/2008 | Wang et al. | |
| 2008/0318115 A1 | 12/2008 | Wang et al. | |
| 2009/0214929 A1* | 8/2009 | Gao | H01M 8/0267 429/457 |
| 2013/0011770 A1* | 1/2013 | Pandy | H01M 8/0254 429/514 |
| 2022/0123328 A1* | 4/2022 | Ebato | H01M 8/0206 |
| 2022/0302470 A1* | 9/2022 | Shikano | H01M 8/0273 |
| 2022/0311019 A1* | 9/2022 | Oda | H01M 4/8807 |

FOREIGN PATENT DOCUMENTS

| | | |
|---|---|---|
| CN | 106887596 A | 6/2017 |
| DE | 10 2009 016 263 A1 | 11/2009 |
| DE | 10 2011 013 633 A1 | 1/2012 |
| DE | 10 2012 209 054 A1 | 12/2012 |
| DE | 10 2013 214 708 A1 | 1/2015 |
| DE | 10 2016 213 057 A1 | 1/2018 |
| JP | 64-63272 A | 3/1989 |
| JP | 6-50640 B2 | 6/1994 |

\* cited by examiner

*Primary Examiner* — Muhammad S Siddiquee
(74) *Attorney, Agent, or Firm* — Seed IP Law Group LLP

(57) ABSTRACT

The invention relates to a fuel cell plate (1) for supplying a reactant to an active region of a fuel cell, having at least one inlet (2) and at least one outlet (3) and also having a flow field (4) which is situated therebetween, is formed on a first surface (5) of the plate (1) and has a plurality of flow guides (6). In this case, at least some of the flow guides (6) are formed as deflection elements (7) in the form of guide vanes, guide panels or wings.

6 Claims, 2 Drawing Sheets

FUEL CELL PLATE

Figure 1:
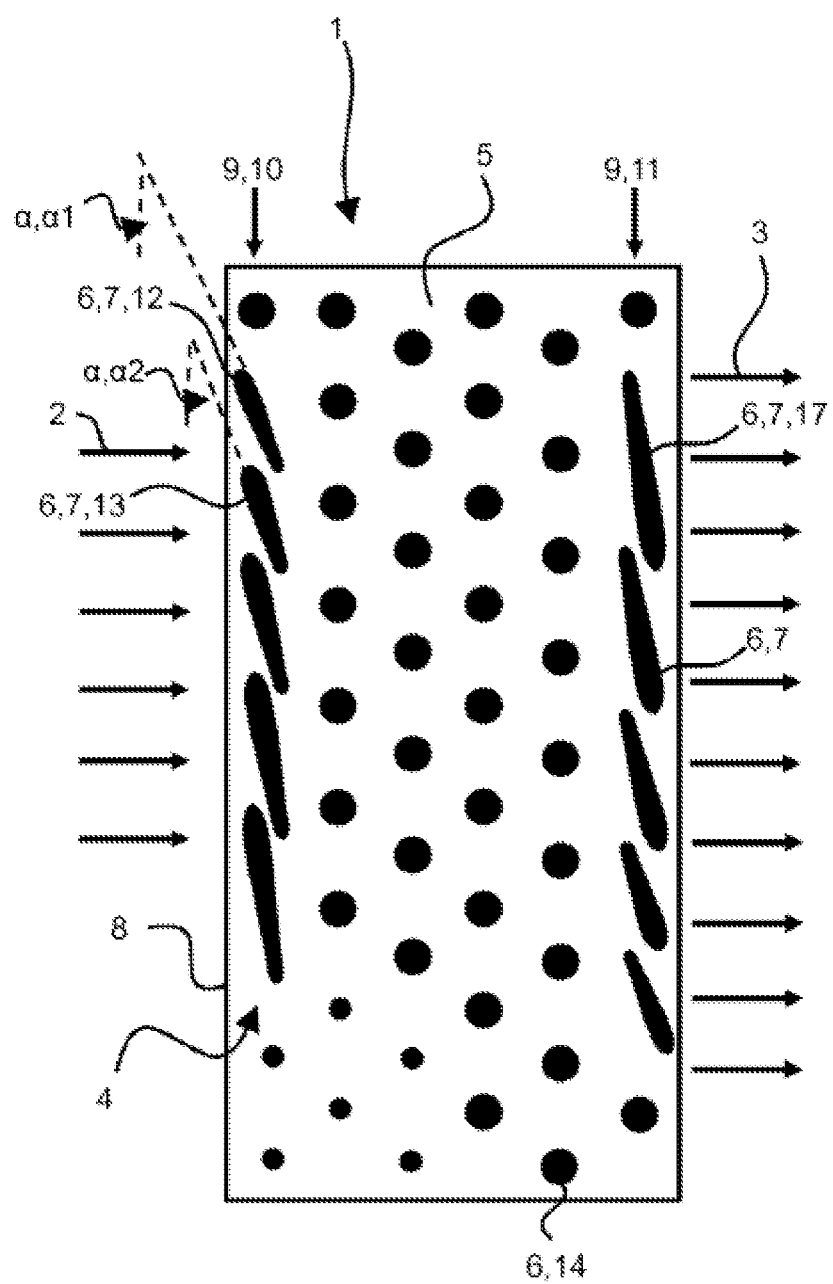

The invention relates to a fuel cell plate for supplying a reactant to an active region of a fuel cell, having at least one inlet and at least one outlet and also having a flow field which is situated therebetween, that is to say a flow field formed between the inlet and the outlet, is formed on a first surface of the plate and has a plurality of flow guides. Such fuel cell plates are also known as bipolar plates and aim to distribute the reactants in question as uniformly as possible over their surface.

DE 10 2009 016 263 A1 shows a fuel cell plate with channels that are arranged in a fan shape for distributing the reactant. The disadvantage of such directed channel arrangements is that the channels need a long extension in order to achieve a good uniform distribution of the reactant towards the active region of the fuel cell. This causes a high pressure differential across the fuel cell plate at a complex geometry and high manufacturing effort associated therewith.

Moreover, in the case of fuel cell plates there is also the approach of open distribution structures, for example in the form of knobs. However, with these structures no satisfactory uniform distribution has been achieved yet and they are only used in conjunction with a high pressure differential.

Therefore, it is the object of the present invention to develop further a fuel cell plate of the type mentioned above in such a way that the abovementioned disadvantages are reduced.

This object is achieved by a fuel cell plate with the features of claim 1, in particular by forming at least a part of the flow guides as deflection elements in the form of guide vanes, guide panels or wings. Advantageous configurations with expedient further developments of the invention are specified in the dependent claims.

These open, but at the same time directed distribution structures enable a uniform distribution of the reactants to the active region of the fuel cell and at the same time space and weight is saved compared to the known directional distribution structure. The deflection elements are preferably designed to taper. Moreover, a plurality of inlets and outlets can be provided. In this case, outlets are preferably arranged distributed over the entire outlet-side plate edge of the bipolar plate, while the inlets are only formed in sections on the inlet-side plate edge.

In order to enable a simple manufacture of the fuel cell plate and an optimal introduction of the reactant to the fuel cell plate, the flow guides are arranged in gaps with respect to a fuel cell plate edge, wherein the deflection elements at least in sections are arranged in an inlet gap formed on the inlet side. In this context it is particularly preferred if those flow guides are formed as deflection elements which are arranged adjacent to the inlets.

In order to enable a uniform outflow of the reactant into the active region of the fuel cell, the flow guides are arranged in gaps with respect to a fuel cell plate edge, and the deflection elements at least in sections are arranged in an outlet gap formed on the outlet side. In this context it is preferred if those flow guides are formed as deflection elements which are arranged adjacent to the outlets.

To guide the reactant over the entire or at least a large part of the first surface, it is preferred if the gaps are arranged alternately offset to each another such that the flow guides form a lattice that is inclined with respect to the fuel cell plate edge. In other words, the lattice has inclined rows.

For improved guidance of the reactant within the fuel cell plate, it is especially provided that the deflection elements with or under an angle of inclination α with respect to the fuel cell plate edge, are arranged in particular in a fanning out manner.

In this context, it is particularly preferred if the angle of inclination $\alpha_1$ of a first deflection element is smaller than the angle of inclination $\alpha_2$ of a second deflection element. In this case, it is particularly advantageous if the first deflection element is arranged adjacent to the second deflection element in the same gap. Furthermore, also a third deflection element may be arranged in the same gap adjacent to the second deflection element, whose angle of inclination $\alpha_3$ is greater is than $\alpha_2$ and thus also larger than $\alpha_1$. In particular, it is preferred if each of the deflection elements of the inlet gap has a lower angle of inclination α than one of the adjacent deflection elements. Conversely, it is preferred if a first deflection element of the outlet gap has a greater angle of inclination α than one of the second deflection elements adjacent thereto. In particular, it is useful if each of the deflection elements of the outlet gap in each case has a greater angle of inclination α than one of the deflection elements adjacent thereto.

In order to enable a cheaper and simpler production of the fuel cell plate, there is another part of the flow guides which is formed as guide elements with a circular or an approximately circular or an oval or a drop-shaped cross-sectional area. Advantageously, the flow guides arranged in the gaps between the inlet gap and the outlet gap are formed as such guide elements. Preferably, the guide elements are formed more regularly and more round in the cross-sectional area, the greater the distance from the inlet gap and the outlet gap. The diameter or the width or the length of the guide elements is preferably smaller, the greater the distance from the at least one inlet. Moreover, also parts of the flow guides of the inlet gap and/or the outlet are formed as such guide elements, in particular those that are not arranged adjacent to one of the inlets and/or one of the outlets.

Furthermore, it is preferred if a first deflection element is formed shorter in a direction of extension than a second deflection element. In this context, it is particularly preferred if the deflection elements of the inlet gap along a first direction are formed becoming longer in their extension, while the deflection elements of the outlet gap preferably along the first direction are formed becoming shorter in their extension.

In order to be able to distribute the reactant flow even better, it is provided in particular that the flow guides are formed at least in sections as the deflection elements in a gap adjacent to the inlet gap and/or in a gap adjacent to the outlet gap, and that the deflection elements are arranged with or at an angle of inclination β with respect to the fuel cell plate edge. In this case, the difference of the angles of inclination between the angle of inclination α of the inlet gap or the outlet gap and the angle of inclination β is preferably 45 degrees to 100 degrees, more preferably from 60 degrees to 90 degrees.

In an alternative configuration, the flow guides can be formed at least in sections as the guide elements in a gap adjacent to the inlet gap and/or in a gap adjacent to the outlet gap, said flow guides being arranged at an angle of inclination β with respect to the fuel cell plate edge. In this case, the difference of the angles of inclination between the angle of inclination α of the inlet gap or outlet gap and the angle of inclination β is preferably 45 degrees to 100 degrees, more preferably 60 degrees to 90 degrees.

To be able to conduct various reactants, it is advantageous for the benefit of a compact structure of a fuel cell stack, if a second flow field with at least one second inlet and at least one second outlet is formed on a second surface of the fuel cell plate opposite the first surface, and when a plurality of flow guides are applied on the second surface, which at least partially are formed as the deflection elements. In this case, individual features of the abovementioned features of the first surface of the fuel cell plate can be implemented also in the second surface of the fuel cell plate.

In a further development that is particularly easy to manufacture, the second surface is formed as a mirror image of the first surface of the fuel cell plate. In an alternative configuration, the arrangement of the deflection elements and the guide elements of the second surface can differ from that of the first surface. The second surface can be adapted, for example, to a second inlet or second outlet positioned differently compared to the first surface, or to a different flow behavior of the reactant of the second surface, which differs from the reactant of the first surface.

Further advantages, features and details of the invention result from the claims, the following description of the preferred embodiments, and from the drawings.

Figure 2:
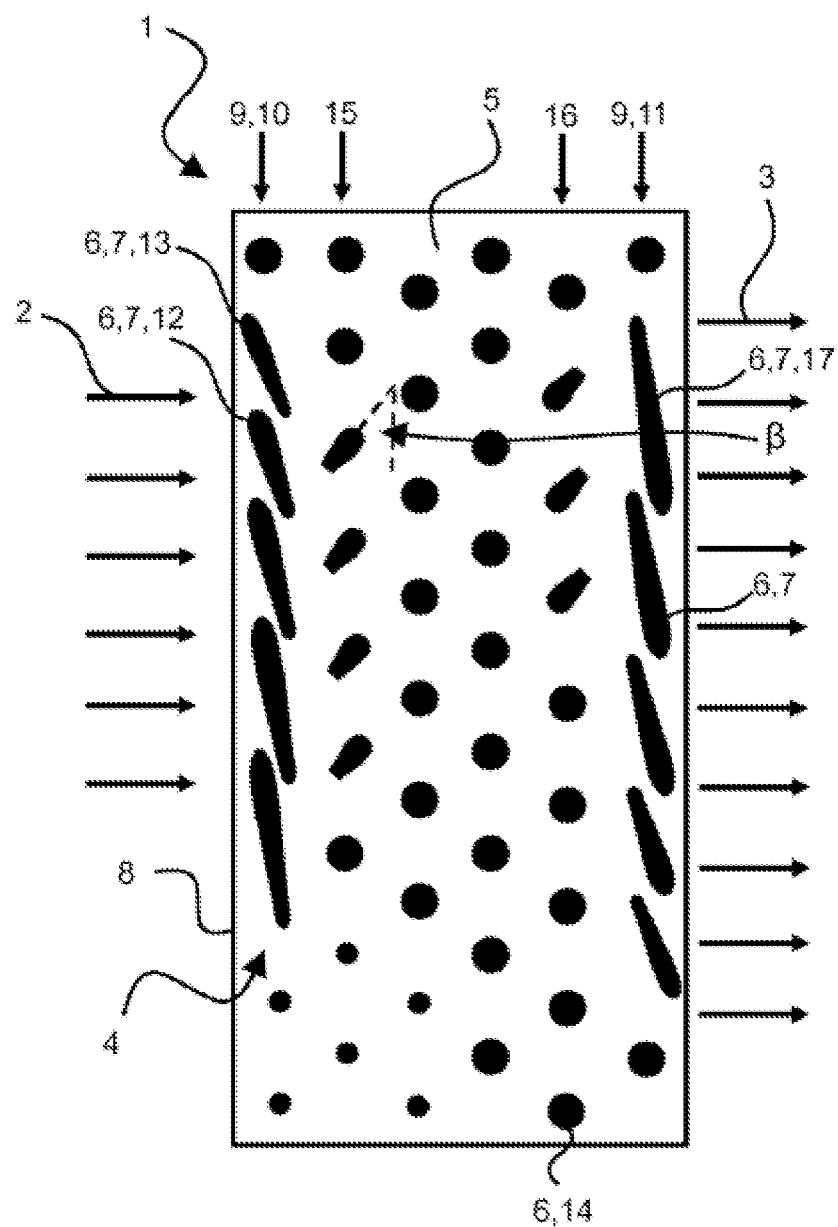

FIG. 1 shows a schematic illustration of a fuel cell plate according to a first embodiment, and FIG. 2 shows a schematic illustration of a fuel cell plate according to a second embodiment.

FIG. 1 shows a fuel cell plate 1 for supplying a reactant to an active region of a fuel cell having a plurality of inlets 2 and a plurality of outlets 3, and with a flow field 4 which is situated therebetween, is formed on a first surface 5 of plate 1 and has a plurality of flow guides 6. In this case, for a more even distribution of the reactants, part of the flow guides 6 is formed as deflection elements 7 in the form of guide vanes.

The flow guides 6 are arranged in gaps 9 with respect to a fuel cell plate edge 8, the gaps 9 being arranged alternately offset to each another for better distribution of the reactants on the first surface 5, such that the flow guides 7 form a lattice that is inclined with respect to the fuel cell plate 8. The deflection elements 7 are arranged in sections in an inlet gap 10 formed on the inlet side, with those flow guides 6 being formed as the deflection elements 7 which are arranged adjacent to the inlets 2. In addition, the deflection elements 7 are also arranged in sections in an outlet gap 11 formed on the outlet side, those flow guides being formed as the deflection elements 7 which are arranged adjacent to the outlets 3.

For improved and more uniform guidance of the reactants, the deflection elements 7 are arranged with or at an angle of inclination $\alpha$ with respect to the fuel cell plate edge 8. In FIG. 1 it is clear that the deflection elements 7 of the inlet gap 10 have a decreasing angle of inclination $\alpha$ relative to the plate edge 8 with increasing distance from a first deflection element 12 of the inlet gap 10. In other words, the angle of inclination $\alpha_1$ of a first deflection element 12 of the inlet gap 10 is larger than the angle of inclination $\alpha_2$ of a second deflection element 13 of the inlet gap 10 adjacent thereto. In addition, it is apparent, that within the inlet gap 10 there is a size gradient of the deflection elements 7 with increasing distance from the uppermost first deflection element 7 of the inlet gap 10. Or in other words: A first deflection element 12 of the inlet gap 10 with respect to its longitudinal extension is formed to be shorter than a second deflection element 13 adjacent thereto.

In case of the outlet gap 11, the situation is reversed: With increasing distance from a first outlet 3 or from the uppermost first deflection element 17 of the outlet gap 11, the deflection elements 7 of the outlet gap 11 are formed to be shorter with respect to their longitudinal extension than the deflection elements 7 adjacent thereto. At the same time the angle of inclination $\alpha$ with respect to the plate edge 8 increases steadily with increasing distance from the first deflection element 17 of the outlet gap 11.

Between the inlet gap 10 and the outlet gap 11, the flow guides 6 are preferably formed as guide elements 14 with a circular cross-sectional area. The flow guides 6 of the inlet gap 10 which are not arranged adjacent to an inlet 2, are formed as guide elements 14. In the inlet gap 10 and in the gaps 9 adjacent thereto, the guide elements 14 with a greater distance from the inlets 2 have a smaller diameter, i. e. here flow structures are deliberately "taken back" in order to distribute the flow over the entire or at least a large part of the first surface 5. In addition, FIG. 1 shows that in the outlet gap 11 also, the flow guides 6 are partially formed as guide elements 14, namely the ones that are arranged non-adjacent to one of the outlets 3.

The fuel cell plate 1 of FIG. 1 is preferably formed as a bipolar plate, that is to say, at its second surface (not shown) opposite the first surface 5 a second flow field is formed with at least one second inlet and at least one second outlet. A plurality of flow guides 6 is applied on the second surface, which flow guides are partially formed as the deflection elements 7 or as the guide elements 14. In this case, the second surface of the fuel cell plate 1 is formed identically to the first surface 5.

FIG. 2 shows a second fuel cell plate 1, differing from the one shown in FIG. 1 only in that the flow guides 6 are formed partially as the deflection elements 7 in a third gap 15 adjacent to the inlet gap 10 and in a fourth gap 16 adjacent to the outlet gap 11. Alternatively, they can also be formed as the guide elements 14 with a drop-shaped cross-sectional area. In addition, the deflection elements 7 or the guide members 14 are arranged at an angle of inclination $\alpha$ with respect to the fuel cell plate edge 8.

Finally, it should be noted that the fuel cell plates 1 shown in FIGS. 1 and 2 are characterized by an optimized reactant flow behavior and thus allow a more uniform distribution of the reactants across the active region.

LIST OF REFERENCE NUMERALS 1 fuel cell plate
2 inlet
3 outlet
4 flow field
5 first surface
6 flow guidance
7 deflection elements
8 fuel cell plate edge
9 gap
10 inlet gap
11 outlet gap
12 first deflection element
13 second deflection element
14 guide elements
15 third gap
16 fourth gap
17 first deflection element (outlet gap)

The invention claimed is:

1. A fuel cell plate for supplying a reactant to an active region of a fuel cell, the fuel cell plate comprising:
   at least one inlet;
   at least one outlet; and
   a flow field situated between the at least one inlet and the at least one outlet,
   wherein the flow field is formed on a first surface of the plate and has a plurality of flow guides,
   wherein at least some of the flow guides are arranged in gaps with respect to a fuel cell plate edge, arranged at least in sections in an inlet gap formed on an inlet side and/or arranged in an outlet gap formed on an outlet side, and arranged at a first angle of inclination with respect to the fuel cell plate edge, wherein at least some of the flow guides are formed as deflection elements in the form of guide vanes, guide panels, or wings, and wherein at least some of the deflection elements are formed in a gap adjacent to the inlet gap and/or in a gap adjacent to the outlet gap, and the deflection elements are arranged at a second angle of inclination with respect to the fuel cell plate edge such that a difference between the first angle of inclination and the second angle of inclination is between 45° and 100°.

2. The fuel cell plate according to claim 1, wherein the gaps are arranged alternately offset to each other such that the flow guides form a lattice that is inclined with respect to the fuel cell plate edge.

3. The fuel cell plate according to claim 1, wherein the first angle of inclination of a first flow guide is greater than the first angle of inclination of a second flow guide.

4. The fuel cell plate according to claim 1, wherein another part of the flow guides is present, which are formed as guide elements with a circular or an approximately circular or an oval or a drop-shaped cross-sectional area.

5. The fuel cell plate according to claim 1, wherein a first flow guide in an extending direction is formed shorter than a second flow guide.

6. The fuel cell plate according to claim 1, wherein a second flow field is formed at a second surface opposite the first surface with at least one second inlet and at least one second outlet in such a way that a plurality of flow guides are applied to the second surface, which are formed at least partially as the deflection elements.

\* \* \* \* \*